Oct. 18, 1927.
H. A. TUTTLE
1,646,124
BRAKE MECHANISM
Filed March 15, 1923
4 Sheets-Sheet 1
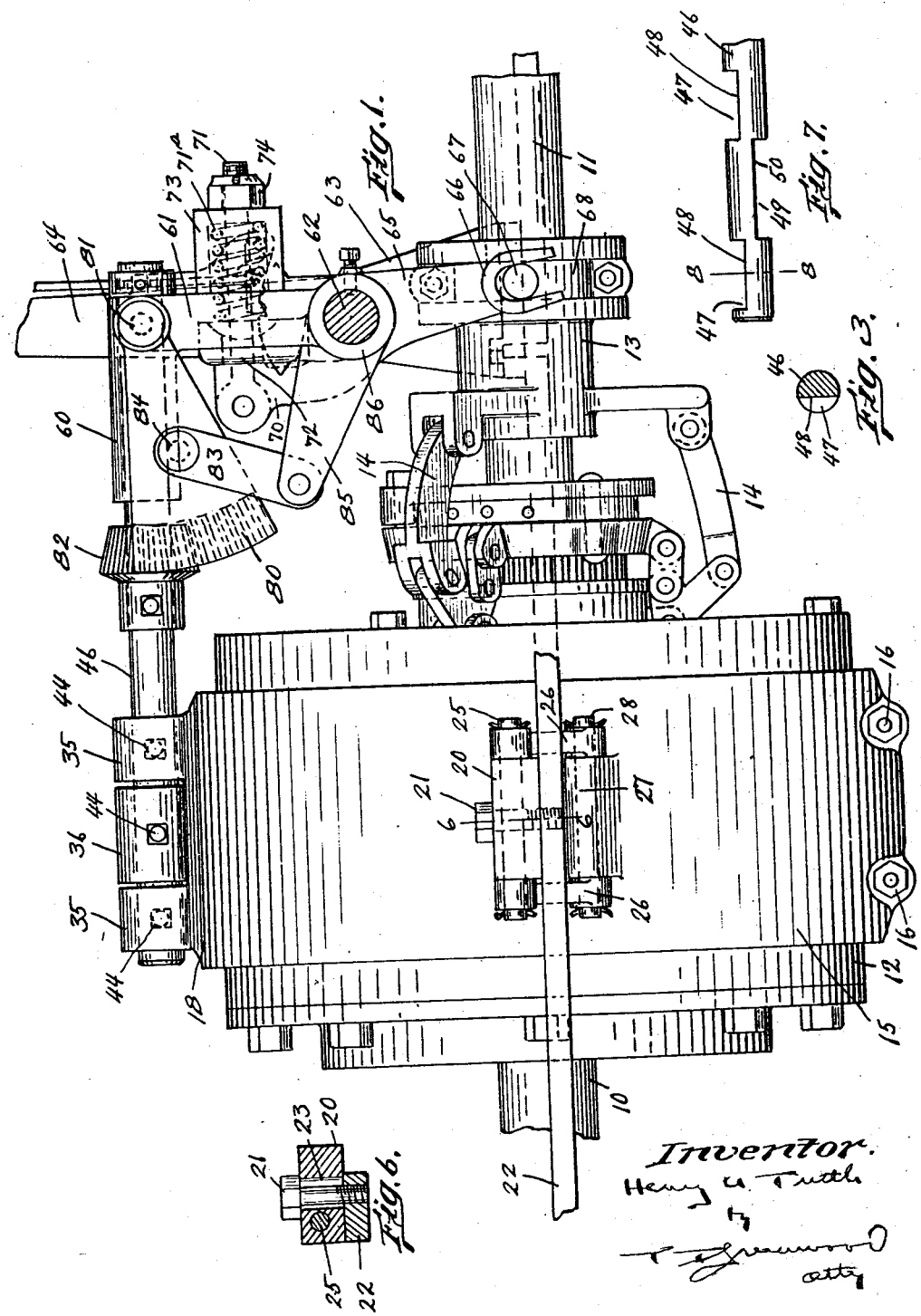

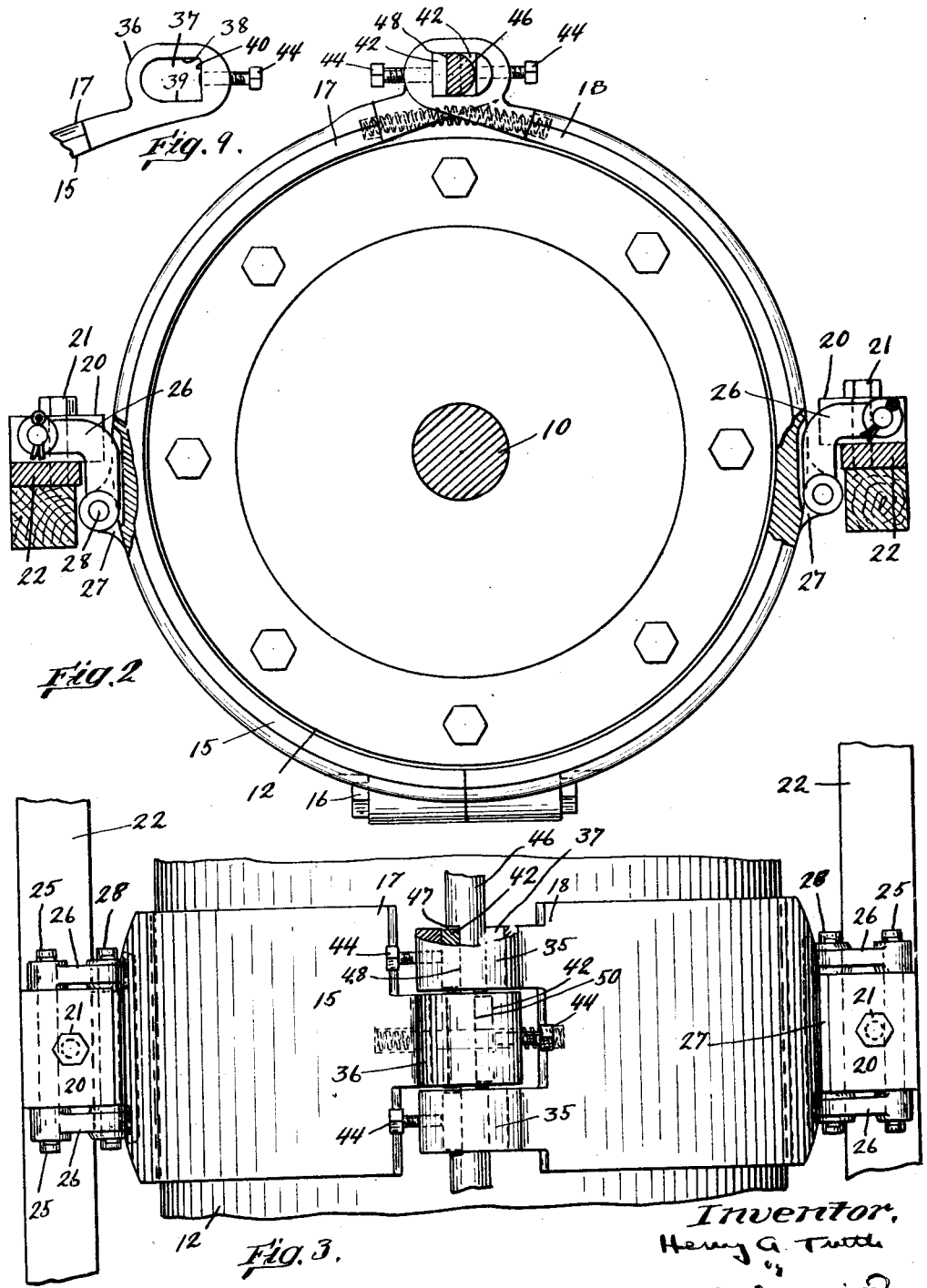

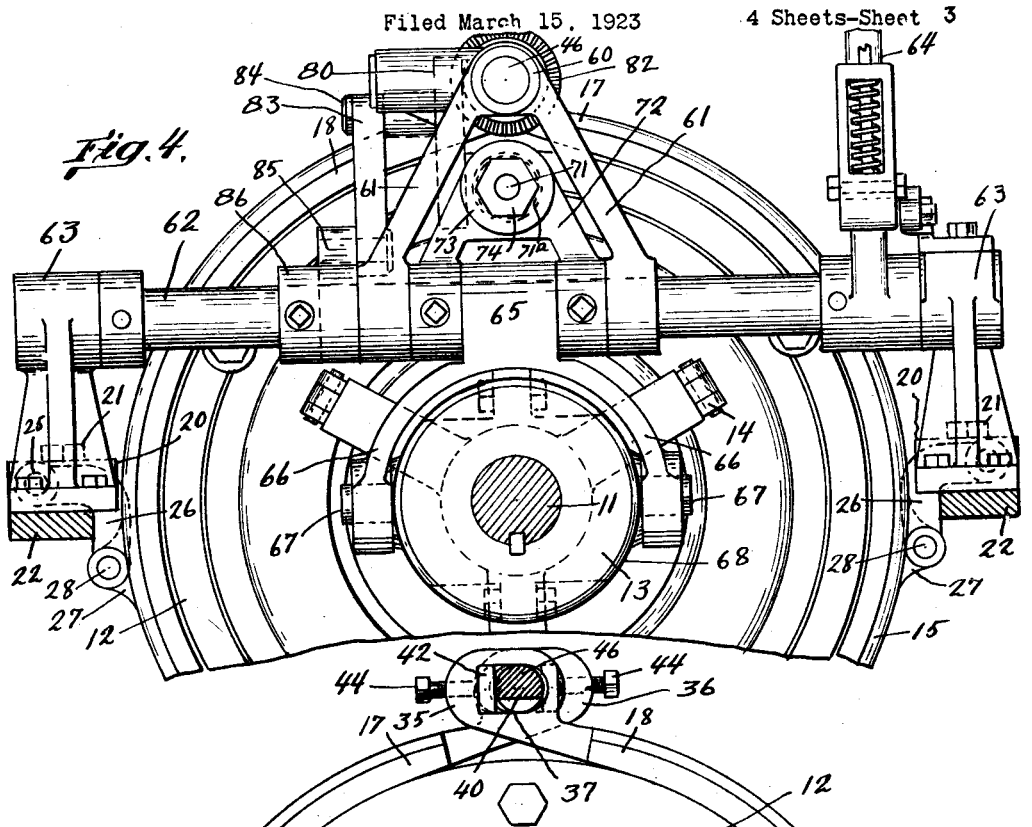

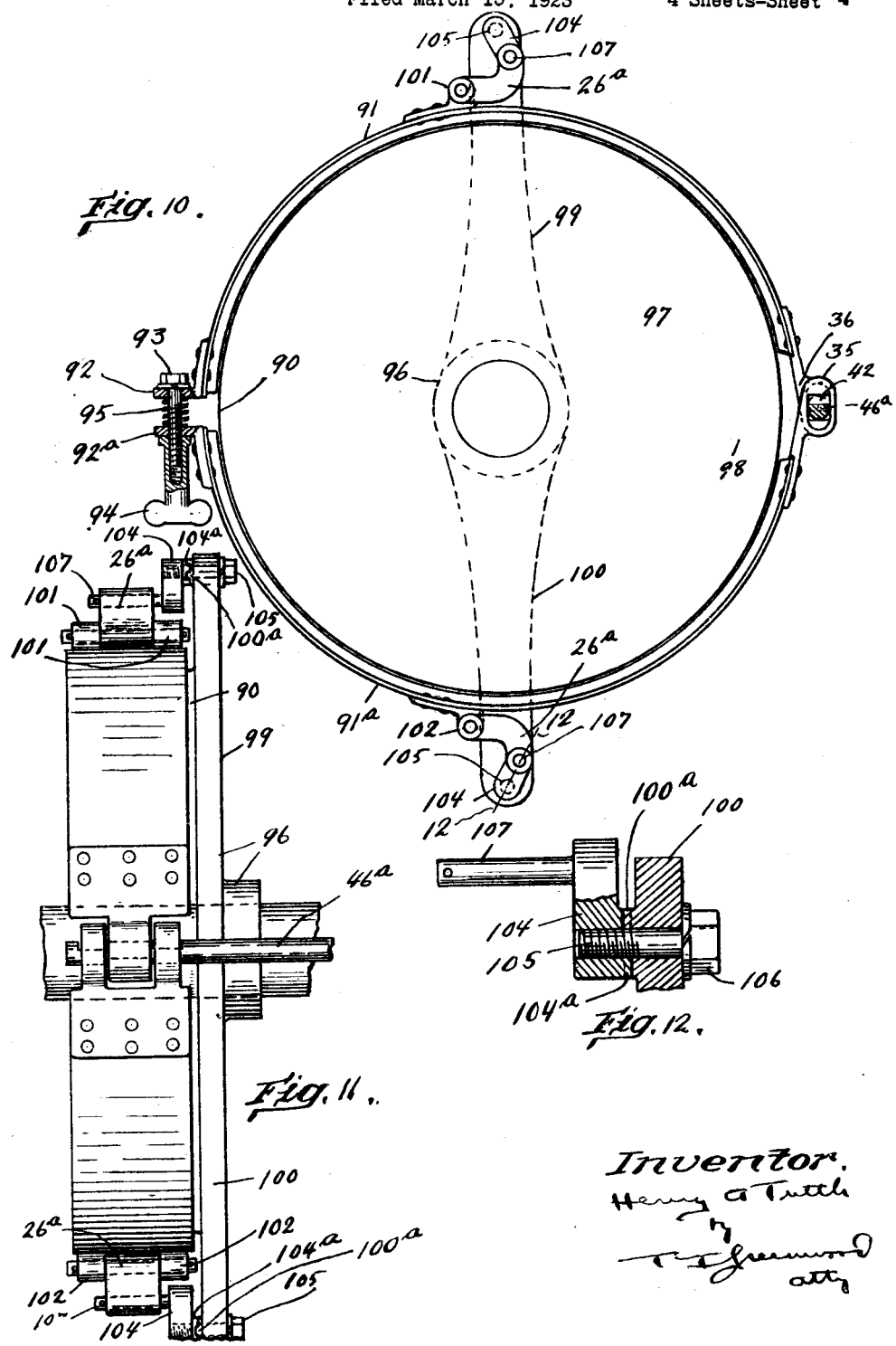

Patented Oct. 18, 1927.

1,646,124

UNITED STATES PATENT OFFICE.

HENRY A. TUTTLE, OF UPTON, MASSACHUSETTS.

BRAKE MECHANISM.

Application filed March 15, 1923. Serial No. 625,387.

This invention relates to brake mechanisms adapted to engage and restrain a rotatable element from rotation or restrict the rotation thereof and is particularly adapted to engage the gearing casing of a reversing gearing and restrain the casing from rotation whereby to condition the reversing gearing for reverse drive, and is herewith particularly described in connection with reversing gearings, although it is not limited to such use.

A reversing gearing may include a driving shaft and a driven shaft and gearing connecting said shafts. The gearing may be contained within, and components thereof may be carried by, a rotatable casing. Clutch mechanism may connect said shafts, casing and gearing for forward drive, and when so connected the casing is adapted to rotate. Brake mechanism is adapted to engage said casing and restrain it from rotation whereby to effect the actuation of the gearing contained therein to secure reverse drive.

The brake mechanism usually includes a flexible brake band which surrounds the gearing casing, and mechanism which is usually disposed above the casing and arranged to draw toward each other the two proximate ends of the brake band whereby to cause the brake band to contract and engage and restrain the casing from rotation. Diametrically opposed arms usually extend laterally from the brake band and rest slidably upon suitable fixed supports whereby to support the brake band against rotation.

With the usual form of brake band as above set forth, it is found that the band may not engage the casing or drum uniformly over its entire surface but that the upper portions of the band, or those portions adjacent the ends of the band, may engage the casing with greatest effect, while the lower or middle portion of the band may be the least effective in engaging the casing.

An object of this invention is to provide a flexible brake band and operating and supporting mechanism for it arranged to cause the brake band to engage the casing substantially uniformly over its entire surface.

In carrying out this object of the invention, I may provide means to contract the band about the casing and supporting means for the band disposed on opposite sides of the band and arranged to be operated by the contracting action of the band to raise the lower portion of the band into position to engage the casing effectively.

In the usual type of brake band, as above described, when the brake is released, it is not held in any definite fixed position with respect to the casing but is free to move laterally and may rub on one side or the other of the casing. Furthermore, when the band is compressed about the casing, the rotation of the casing tends to lift up one side of the band and depress the other side and thereby cause undue strains to the casing and shaft bearings.

It is an object of the present invention to provide supporting means for the brake band so arranged that when the brake band is released the supporting means will move the band away from engaging relation with the casing and hold it positively away from the casing and prevent the above-described lateral movement.

The supporting means is also so arranged that the brake band is held in engaging relation with the casing without being lifted on one side; and, also, is supported on opposite sides of the casing against lateral displacement.

The brake operating mechanism used especially with reversing gearing tends to move the brake axially on the casing when contracting the band.

A further object of this invention is to provide improved operating mechanism for the brake band and, specifically, mechanism so arranged as to expand and contract the band without moving it axially of the casing.

A further object is generally to improve the construction and operation of brake mechanism.

Certain features of this invention are disclosed in my co-pending application Serial No. 625,388, filed Mar. 15, 1923.

Fig. 1 is a side elevation of a reversing gearing to which my novel brake mechanism is applied.

Fig. 2 is a front view, partly in section, and illustrating the brake band in expanded position and free from the casing.

Fig. 3 is a plan detail of the brake band.

Fig. 4 is an end detail of the gearing casing and illustrates more particularly the operating mechanism for the brake band.

Fig. 5 is an end view of the casing and illustrates the brake band in contracted or braket-set position.

Fig. 6 is a sectional detail along line 6—6 of Fig. 1.

Fig. 7 is a detail of the cam shaft of the brake operating mechanism and illustrates particularly the cam portions thereof.

Fig. 8 is a section along line 8—8 of Fig. 7.

Fig. 9 is a detail of a lug on the end of the brake band and illustrates particularly the character of the cam passage therethrough.

Fig. 10 is a side elevation, in detail, of a modified form of brake band especially adapted for use in automobiles.

Fig. 11 is a plan view of Fig. 10.

Fig. 12 is a sectional detail along line 12—12 of Fig. 10 and particularly illustrating a form of adjustable supporting means for the brake band.

As shown in Figs. 1 through 10, the brake mechanism embodying my invention is applied to the reversing gearing comprising the driving shaft 10 and the driven shaft 11 which are connected through gearing enclosed within the casing or drum having the cylindrically-shaped outer wall 12. The brake mechanism is adapted to hold the casing stationary to set into operation the gearing contained therein to secure reverse drive of the driven shaft 11. Clutch mechanism is or may be also contained within the casing to connect the driving and driven shafts, through the casing and gearing, for forward drive, and the clutch operating mechanism includes the sleeve 13 which is freely mounted on the driven shaft 11 and is movable axially thereon to actuate the link and lever mechanism 14, whereby to actuate the clutch mechanism, not shown.

The reversing gearing herein illustrated forms no part of the invention but certain features of it are disclosed and claimed in my above-named co-pending application and, for the purposes of the invention, the casing 12 may be any rotatable casing, or brake drum, to which a braking effect is adapted to be applied.

The brake-mechanism embodying this invention includes the brake band 15 of suitable material, and flexible, whereby it may be contracted to engage the casing 12 to restrain it from rotation, and expanded to disengage and release the casing for rotation. As here shown, the brake band is made in two complementary parts, for convenience in manufacture and assembly, and said complementary parts may be secured together by suitable means as the bolts 16; and the connection between the two parts is preferably at the middle and lowest portion of the brake band. The ends 17 and 18 of the brake band are disposed in proximity above the top of the casing and appropriate mechanism, hereinafter to be described, is arranged to draw the ends toward each other and contract the band and set the brake, and also to move the ends apart and expand the band and release the brake.

The usual type of brake band for reversing gearing has diametrically opposed and laterally extended feet which are adapted to be supported slidably on suitable fixed supports. As thus arranged, the brake band, when applied, has a tendency to ride up on one side and raise its supporting foot from its support, and this action may result in undue strains to the casing and the shaft bearings.

In accordance with this invention, I provide means to support the brake band on opposite sides in such a manner that the brake band can not ride up on one side and exert a pressure tending to set up undue strains and force the driving and driven shafts out of alignment.

Said supporting means for the brake band includes the blocks 20 which are disposed on opposite sides of the brake band and secured by suitable means as the bolts 21 to suitable fixed supports as the rails 22. Preferably said blocks 20 are adjustable toward and away from the gearing casing and said adjustment may be provided by having the bolt holes 23 in said block of larger diameter, in the direction of movement of the blocks, than the clamping bolts 21, as illustrated in Fig. 6.

Pivot pins 25 are fixed and extended through the opposite sides of said blocks and swinging links 26, preferably of more or less L-shape, are pivotally mounted on the extended ends of said pivot pins and depend therebelow. Said brake band is formed or provided with ears 27 disposed between said links 26, and pivot pins 28 are or may be fixed therein and extended in both directions therebeyond; and the lower ends of said links 26 are pivotally received thereon. Preferably, the pivot pins 25 are disposed above and laterally outward beyond the pivot pins 28 and also preferably, a line connecting the center of said pivot pins 25 and 28 for best results with the particular arrangement here shown should be approximately tangential to the periphery of the casing 12.

The swinging supporting mechanism for the brake band serves to raise the lower portion of the brake band upwardly and into contact with the casing 12 for, when the free ends of the brake band are contracted, the side portions of the brake band to which the links 26 are connected, are moved inwardly to engage the brake band. The inward movement of the side portions of the brake band serves to move the links 26 inwardly and, by reason of the pivotal connections, the lower ends thereof are also constrained to move upwardly and consequently the lower part of the brake band is also moved upwardly and into engagement with the casing 12. When the pressure tending to contract the brake band is released and the brake band expands by reason of its inherent resiliency or when, by suitable means, the brake band is expanded, the side portions thereof move outwardly and the lower portion, by reason of said levers 26, is moved downwardly and into a position free of said casing. With this arrangement, the brake band may be caused to engage the casing with substantially uniform effect over its entire braking surface.

With the usual type of brake band support employed in reversing gearing, the supporting feet rest loosely upon, but are not secured to, the fixed supports and when the brake is applied the brake band rides up on one side or the other and is supported only at one point; and consequently the brake band may sometime chatter, or vibrate, between its lateral supports. With the construction herewith described, the brake band is supported at all times on opposite sides by both sets of links 26, one set of which will be under compression and the other set under tension, and the brake band will be held centrally without appreciable chatter or vibration.

The novel brake-operating mechanism embodying my invention is arranged to expand and contract the brake band without exerting a force on it tending to move it axially on the casing 12. The end 18 of the brake band is formed or provided with the two spaced lugs 35 and the end 17 of the brake band is formed or provided with the lug 36 disposed within the space between said lugs 35 for engagement with the brake operating mechanism.

Said lugs 35 are formed with cam passages 37 therethrough which are of substantial transverse length as compared to height and are or may be formed with the parallel top and bottom walls 38 and 39 respectively and the end wall 40 disposed at substantially right angles to said top and bottom walls. Wear plates 42 are disposed in said passages against the end wall 40 and are adapted to receive the wear of the cam shaft. Said plates 42 may be adjusted inwardly by the adjusting screws 44 which are threaded in said lugs and bear against said plates. Said lug 36 is similarly arranged but the cam passage is relatively reversed in position.

The operating mechanism for the brake band includes the rotatable cam shaft 46.

Said shaft is extended through the cam passages in the lugs 35 and 36 and is formed with the recesses 47 having the bottom walls 48 adapted to receive wear plates 42 carried by said lugs 35.

The shaft is also formed with a third and similar but relatively oppositely disposed recess 49 intermediate the recesses 47 and said recess 49 terminates in the bottom wall 50 and is adapted to receive the wear plate carried by the lug 36 of the brake band.

Said cam shaft 46 is adapted to be moved angularly to contract and expand the brake band. When the brake band is in expanded position, and free from the casing 12, the cam shaft is or may be in the relative position shown in Fig. 2, and the resiliency of the brake band is arranged to draw the wear plate 42 carried by the lugs 35 and 36 against the bottom walls of the respective recesses in the cam shaft. When the cam shaft is rotated in a clockwise direction, Fig. 2, the outer edges of the bottom walls of the recesses in the cam shaft are forced against said wear plates to force the lug 36 of the brake band toward the right and the lugs 35 of the brake band toward the left, whereby to contract the brake band about the casing 12. The extent of angular movement of the cam shaft necessary to set the brake may depend upon the initial clearance between the brake band and casing, and the operating mechanism associated with the cam shaft may be arranged to hold the cam shaft in its angularly moved position, whereby to hold the brake band in contracted position or the cam shaft may be arranged to be rotated substantially ninety degrees to a position as illustrated in Fig. 5 and in such position the cam shaft will hold the brake band in contracted condition independently of holding means for the cam shaft. When the cam shaft is reversely rotated to restore it to its initial position, the brake band expands by its inherent resiliency, or the band may be forcibly expanded in any suitable or desirable manner, to release it from engagement with the casing.

The end of the cam shaft 46 is rotatably received in and supported by a relatively long hub 60 from which depend two integral arms 61 through lower ends of which the transverse shaft 62 is rotatably passed. Said shaft 62 is disposed above the driven shaft 11 and is rotatably received in and supported by the standards 63 which are carried by suitable supports as the rails 22. An operating handle 64 is or may be fixed to said shaft by which to move it angularly to operate the clutch and brake mechanism of the reversing gearing alternately for forward and reverse drives. A yoke 65 is pivotally carried by said shaft and has depending arms 66 which straddle the driven shaft and are pivotally connected to pins 67 of a collar 68 which is rotatably received in an annular groove in the thrust sleeve 13 of the clutch operating mechanism. Said yoke has an arm 70 which is extended upwardly above the transverse shaft 62 and is pivotally connected with a screw threaded pin 71. Said link is passed loosely through a bracket 72 fixed to the transverse shaft 62 and a compression spring 71ª encircles said pin 71 and bears against said bracket and a spring housing 73 received on said pin 71 over said spring. A nut 74 is adjustably threaded on said pin to vary the pressure of the spring. Said arrangement provides means by which the thrust sleeve of the clutch operating mechanism is yieldingly connected with the shaft 62 and which admits of continued movement of said shaft, by compression of said spring, after the thrust sleeve is restrained from further axial movement in a clutch-release direction, to operate the brake mechanism.

The mechanism for rotating the cam shaft 46 may be of any suitable construction or arrangement and as here shown includes a gear sector 80 which is pivoted on a pin 81 carried by the hub 60; and said sector meshes with a pinion 82 fixed to said cam shaft. A link 83 is pivotally connected by a pin 84 to said gear sector and is also pivotally connected to an arm 85 which has a hub 86 fixed to the transverse shaft 62. When said shaft 62 is rotated in a clockwise direction, Fig. 1, said arm 85 and link 83 and gear sector 80 operate to rotate the cam shaft 46 to expand the brake band and, when said shaft 62 is rotated in the reverse direction, operate to rotate the cam shaft in the reverse direction to contract the brake band about the casing 12.

In Figs. 10, 11 and 12, I have shown my invention applied more particularly to automobiles. In this modification, 90 represents the brake drum of an automobile wheel, as one of the rear wheels. The brake band is or may be made in two parts 91 and 91ª which may have the lugs 92 and 92ª secured to the rear and proximate ends thereof. A bolt 93 may pass slidably through said lugs and a wing nut 94 may be threaded on said bolt and engage one of said lugs, whereby to draw the ends of the brake band together and compensate for wear on the drum-engaging surfaces thereof. A compression spring 95 may encircle said bolt 93 and bear against said lugs and tend to separate the ends of the band, which action will be resisted by the bolt 93 and wing nut 94.

A shaft 46ª may be connected with the ends of the brake band and serve to expand and contract the band in the manner described in connection with Figs. 1 through 9, or other suitable means may be provided to operate the brake.

A supporting member 96 may be carried by the housing 97 of the rear axle and may have arms 99 and 100 which extend upwardly and downwardly, respectively, to provide supporting means for the intermediate portions of the brake band. The brake band is or may be provided with lugs 101 and 102 at the top and bottom thereof to which links 26ª, corresponding to the links 26, are pivotally connected and said links are or may be connected with said arms 99 and 100 by suitable adjusting means.

The adjusting means may each include the member 104 which may have an internally screw-threaded aperture adapted to receive the clamping bolt 105; and said bolt is or may be passed through an arm, as the arm 100, whereby to secure said member 104 to said arm. Said member 104 may be formed or provided with interlocking members or teeth 104ª which are adapted to engage complementary interlocking members or teeth 100ª of said arm 100, whereby to hold said member 104 positively in adjusted positions thereof.

When the brake band is adjusted to take up wear, the wing nut 94 is turned to draw the rear ends of the two sections of the brake band closer together, and consequently the entire brake band is moved bodily to the rear, to some extent. The arrangement of the supporting and adjusting members 104 is such that as said members are rotated in the arms 99 and 100 to compensate for this rearward movement, the pins 107 thereof are simultaneously moved inward and downward, whereby to re-center the brake band with the brake drum.

The invention may be otherwise modified without departing from the spirit thereof.

I claim:

1. Brake mechanism comprising the combination of a brake drum, a brake band engageable with said brake drum, operating mechanism arranged to contract said brake band about said brake drum and means pivotally connected with said brake band arranged to be operated by the contracting thereof to swing said brake band bodily into engagement with said brake drum.

2. Brake mechanism comprising the combination of a brake drum, a brake band engageable with said brake drum, operating mechanism arranged to contract said brake band about said brake drum, including band-supporting means pivotally connected with said band arranged to be operated through said band to swing said band bodily into and away from engaging relation with said brake drum.

3. Brake mechanism comprising the combination of a brake drum, a flexible brake band encircling said brake drum, operating mechanism arranged to contract the brake band to set the brake, and means pivotally connected with said brake band arranged to be operated by the contracting thereof to swing said brake band bodily toward said operating mechanism and into engagement with said brake drum.

4. Brake mechanism comprising the combination of a flexible brake band encircling said drum, operating mechanism arranged in engagement with the ends of said band and operable to contract the band about said drum, and means pivotally connected with intermediate portions of said band arranged to be operated by the contracting thereof to swing said brake band bodily toward said operating mechanism and into engagement with said brake drum.

5. Brake mechanism comprising the combination of a brake drum, a brake band encircling and contractible into engagement with said drum, and operating mechanism arranged to contract said band into engagement with said drum including means to contract and expand the ends of said band, and a band-suspension mechanism including a plurality of swinging operating members disposed about and in pivotal supporting relation with said brake band arranged to swing said brake band into and away from engagement with said brake drum by the contraction and expansion of said band.

6. Brake mechanism comprising the combination of a brake drum, a brake band engageable with said drum, band-collapsing mechanism and other operating mechanism connected with and arranged to act upon said brake band at a plurality of points by the movement of said band to swing it into and away from engagement with said brake drum.

7. Brake mechanism comprising the combination of a brake drum, a brake band engageable with said drum, and operating mechanism including an actuating member arranged to contract said band and a plurality of band-supporting and operating members disposed about and connected with said band arranged to be operated through said band by the operation of said actuating member to move said band into engagement with said brake drum.

8. Brake mechanism comprising the combination of a brake drum, a brake band engageable with said drum, and operating mechanism including an actuating member and a plurality of swinging band-supporting and operating members disposed about and connected with said band arranged to contract said band into engagement with said drum.

9. Brake mechanism comprising the combination of a brake drum, a brake band engageable with said drum, and operating mechanism including an actuating member engaging the ends of said band and a plurality of band-supporting and operating members disposed about and connected with said band arranged to contract said band under control of said actuating member.

10. Brake mechanism comprising the combination of a brake drum, a brake band encircling and contractible into engagement with said drum and operating mechanism for contracting said brake band including a plurality of swinging operating members having fixed pivotal supports disposed about the periphery of and pivotally connected with said brake band arranged to act upon said brake band and swing it into and away from engagement with said brake drum, and means including said brake band arranged to actuate said operating members.

11. Brake mechanism comprising the combination of a brake drum, a brake band encircling and contractible into engagement with said drum, and operating mechanism for contracting said brake band including a plurality of swinging operating members having fixed pivotal supports disposed externally about the periphery of and pivotally connected with said brake band arranged to act upon said brake band and swing it into and away from engagement with said brake drum, and means including said brake band and a mechanism to effect the contraction and expansion of the ends of said brake band arranged to actuate said operating members.

12. Brake mechanism comprising the combination of a brake drum, a brake band encircling and contractible into engagement with said brake drum, and operating mechanism for contracting said brake band including a fixed support, a plurality of band-operating and supporting links disposed about the periphery of said brake band and having fixed pivotal connections with said brake band and also with said support, and means to actuate said links to move said band into and away from engagement with said brake drum.

13. Brake mechanism comprising the combination of a brake drum, a brake band encircling and contractible into engagement with said brake drum, and operating mechanism for contracting said brake band including a fixed support, a plurality of band-operating and supporting links disposed about the periphery of said brake band and having fixed pivotal connections with said brake band and also with said support, and means including said brake band arranged to actuate said links whereby to move said band into and away from engagement with said brake drum.

14. Brake mechanism comprising the combination of a brake drum, a brake band engageable with said brake drum, and operating mechanism for said brake band including a fixed support, a plurality of band-operating and supporting links disposed about the periphery of said brake band and pivotally connected with said brake band and support, and means to move said links inwardly whereby to contract said brake band, said means including said brake band and means to contract the ends of said brake band.

15. Brake mechanism comprising the combination of a brake drum, a brake band encircling and contractible into engagement with said brake drum, and operating mechanism arranged to contract said brake band into engagement with said brake drum comprising a fixed support, links disposed on opposite sides and externally of said brake band and having fixed pivotal connections with said support and also with said brake band below the center of the brake band, and means disposed above the center of said brake band to contract the ends of said brake band.

16. Brake mechanism comprising the combination of a brake drum, a brake band encircling and contractible into engagement with said brake drum, and operating mechanism arranged to contract said brake band about said brake drum comprising a fixed support, downwardly inclined links disposed on opposite sides and externally of said brake band and having fixed pivotal connections with said support and also with said brake band below their pivotal connections with said support, and means to contract the ends of said brake band.

17. Brake mechanism comprising the combination of an external contracting brake band having proximate free ends, means to contract the ends of said brake band, a fixed support, and band-supporting links having fixed pivotal connections with said support on approximately diametrically-opposite sides and externally of said band and pivoted to said band below the pivotal connection of said links with said support.

18. Brake mechanism comprising the combination of a brake drum, a brake band adapted to engage said drum having proximate free ends, means to contract and expand the ends of said brake band whereby to cause the brake band to engage and release said brake drum, a fixed support, and band-supporting links pivoted to said support on approximately diametrically-opposite sides of said band and pivoted to said band below the pivotal connection of said links with said support, the pivotal connection between each link and the support and brake band being in a line approximately tangential with the periphery of the brake drum.

19. Brake mechanism comprising a brake drum, a brake band having proximate upper ends and adapted to be contracted and expanded about said drum, means to contract and expand the ends of said brake band, and band-supporting means disposed on opposite sides of and having pivotal connections with the band and operated by movements of the brake band to swing the lower portion of said brake band into and also away from engagement with said brake drum.

20. Brake mechanism comprising a brake drum, a brake band having proximate upper ends and adapted to be contracted and expanded about said drum, means to contract and expand the ends of said brake band, and means engageable with approximately diametrically-opposite sides of said brake band arranged to raise and lower the lower portion of said brake band into and away from engagement with said brake drum.

21. Brake mechanism comprising a brake drum, a brake band having proximate upper ends and adapted to be contracted and expanded about said drum, means to contract and expand the ends of said brake band, and means actuated by the contraction of the ends of and through said brake band to raise the lower portion thereof into engagement with said brake drum.

22. Brake mechanism comprising a brake drum, a brake band having proximate upper ends and adapted to be contracted and expanded about said drum, means to contract and expand the ends of said brake band, and means actuated by said contracting means to raise and lower the lower portion of said brake band into and away from engagement with said brake drum, said raising and lowering means arranged to hold the brake band free from said brake drum in the expanded condition of said brake band.

23. Brake mechanism comprising the combination of a brake band having proximate free ends, means to contract and expand the ends of said brake band, and supporting means for said brake band comprising a support, and substantially L-shaped links pivoted to said support and to substantially diametrically-opposite sides of said brake band below the pivotal connection of said links with said support.

24. Brake mechanism comprising the combination of a brake band having proximate free ends, means to contract and expand the ends of said brake band, and supporting means for said brake band comprising a support, links disposed on diametrically-opposite sides of said brake band and pivoted to said support and to said brake band below said pivotal connection with said support, and means to adjust the pivotal connections between said links and support.

25. Brake mechanism comprising the combination of a brake band having free ends, means to contract and expand the ends of said brake band, and supporting means for said brake band comprising links pivoted to opposite sides of said brake band, fixed pivotal supports for said links disposed above the pivotal connection between said links and said brake band, and means to move said fixed pivotal supports toward and away from said brake band.

26. Brake mechanism comprising the combination of a brake band having free ends, means to contract and expand the ends of said brake band, and supporting means for said brake band comprising links pivoted at approximately diametrically-opposed points to said brake band, and fixed pivotal supports for said links disposed above the pivotal connection between said links and brake band, said fixed pivotal supports comprising a fixed supporting member and pivot pins for said links eccentrically carried by and adjustable in said fixed supporting member.

27. Brake mechanism comprising the combination of a brake band having two opposed complementary sections, brake-pressure adjusting means including an adjusting bolt connecting complementary ends of the sections, means arranged to contract and expand said brake band connected with the other complementary ends of the sections, and supporting means for said brake band comprising links pivoted to the middle portions of said band-sections, and fixed supports for the free ends of said links.

28. Brake mechanism comprising the combination of a brake band having two opposed complementary sections, brake-pressure adjusting means including an adjusting bolt connecting proximate ends of the sections, means arranged to contract and expand said brake band connected with the other proximate ends of the sections, and supporting means for said brake band comprising links pivoted to intermediate portions of said band-sections, and adjustable, fixed supports for the free ends of said links.

29. Brake mechanism comprising the combination of a brake drum, a brake band encircling said brake drum, means to contract and expand said brake band, and supporting mechanism for said brake band including means engageable with opposite sides of said brake band arranged to hold said band in co-axial relation with said brake drum in expanded and also contracted conditions of said band and also hold said opposite sides of said brake drum against the tendency to rotate when in engagement with said brake drum.

30. Brake mechanism comprising a brake drum, a brake band having proximate upper ends and adapted to be contracted and expanded about said drum, means to contract and expand the ends of said brake band, band-supporting means having provision for raising and lowering the lower portion of said brake band into and away from engagement with said brake drum and means positively to secure said band-supporting means in adjusted positions thereof.

In testimony whereof, I have signed my name to this specification.

HENRY A. TUTTLE.